United States Patent
Weiss et al.

(10) Patent No.: US 8,788,323 B2
(45) Date of Patent: Jul. 22, 2014

(54) METHOD AND SYSTEM FOR PROVIDING CONSUMER DEFINED COUPONS

(75) Inventors: Benjamin Weiss, Portola Valley, CA (US); James Robert Del Favero, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 1320 days.

(21) Appl. No.: 11/780,424

(22) Filed: Jul. 19, 2007

(65) Prior Publication Data

US 2009/0024464 A1     Jan. 22, 2009

(51) Int. Cl.
     *G06Q 30/00*         (2012.01)
(52) U.S. Cl.
     USPC .............. 705/14.1; 705/14.39; 705/14.55; 705/14.25; 705/14.66
(58) Field of Classification Search
     USPC .......... 705/14, 14.1, 14.39, 14.55, 14.25, 705/14.66
     See application file for complete search history.

(56) References Cited

U.S. PATENT DOCUMENTS

| | | | | |
|---|---|---|---|---|
| 6,085,169 | A * | 7/2000 | Walker et al. | 705/4 |
| 6,119,100 | A * | 9/2000 | Walker et al. | 705/20 |
| 6,223,163 | B1 * | 4/2001 | Van Luchene | 705/16 |
| 6,230,150 | B1 * | 5/2001 | Walker et al. | 705/400 |
| 6,267,670 | B1 * | 7/2001 | Walker et al. | 463/17 |
| 2002/0095333 | A1 * | 7/2002 | Jokinen et al. | 705/14 |
| 2003/0004802 | A1 * | 1/2003 | Callegari | 705/14 |
| 2003/0069785 | A1 * | 4/2003 | Lohse | 705/14 |
| 2006/0219780 | A1 * | 10/2006 | Swartz et al. | 235/383 |
| 2006/0282410 | A1 * | 12/2006 | Weitzman et al. | 707/3 |
| 2007/0156528 | A1 * | 7/2007 | Hopp et al. | 705/14 |
| 2007/0162341 | A1 * | 7/2007 | McConnell et al. | 705/14 |
| 2007/0226082 | A1 * | 9/2007 | Leal | 705/27 |
| 2008/0228565 | A1 * | 9/2008 | Algiene | 705/14 |

FOREIGN PATENT DOCUMENTS

CN            1879121 A      12/2006
WO     WO 2005/064515      7/2005

* cited by examiner

*Primary Examiner* — Luis A Brown
(74) *Attorney, Agent, or Firm* — Hawley Troxell Ennis & Hawley LLP; Philip McKay

(57) ABSTRACT

A method and system for providing consumer defined coupons includes a process for providing consumer defined coupons whereby a consumer proposes/defines the parameters or "terms" of a proposed coupon and/or marketing offer that the consumer feels would compel the consumer to purchase a product and/or service, shop at a defined store, or perform some other defined action. The consumer defined coupon terms are then provided to a potential coupon provider. The potential coupon provider is then provided the opportunity to review the consumer defined coupon terms. The potential coupon provider is then provided the opportunity to accept the consumer defined coupon terms, reject the consumer defined coupon terms, and/or propose alternative coupon terms. If the potential coupon provider accepts the consumer defined coupon terms, a coupon is then created and provided to the consumer.

16 Claims, 2 Drawing Sheets

METHOD AND SYSTEM FOR PROVIDING CONSUMER DEFINED COUPONS

BACKGROUND

Many providers of consumer goods and services, and other advertisers, offer coupons, and/or other marketing devices such as discount certificates, price guarantees, and vouchers, to consumers in an effort to attract and/or encourage business.

Traditionally, coupons have been distributed in "hard-copy", typically printed, form by various means, including, but not limited to: by mail; in newspapers; in magazines; in flyers and inserts; at store front and/or product displays; and/or as attachments to store receipts (i.e., printed on the back of a receipt or appended to a receipt). More recently, coupons have been offered/distributed using electronic means such as, but not limited to: networks of computing systems, including public networks such as the Internet; through and/or on websites; by e-mail; as electronic coupon attachments to electronic receipts; and as electronic coupon attachments to transactional data, such as, but not limited to transactional data from and/or displayed by, banks, credit card companies, and other financial institutions Many coupons offer significant discounts to the consumer holding, and meeting the terms of, the coupon. Therefore, coupons can represent a significant expense to the coupon provider. Typically, the coupon provider is willing to accept this expense to meet specific coupon provider goals, including, but not limited to: to help build up a customer base; to get consumers into a store; to retain customers who find a lower price for an item from a competitor; to lure customers away from a competitor; and/or to help clear excess inventory and/or to boost sales of a given product.

Currently, coupons are typically distributed or "pushed" by providers of consumer goods and services, i.e., coupon providers, to the consumers. Consequently, currently, the offer represented by the coupon is typically generically defined by the coupon provider in advance of coupon distribution and the coupons are then typically made available to large numbers of consumers in a "blanket" distribution manner. As a result, using current coupon distribution methods, many coupons are created and distributed to consumers that have no interest in, and/or need for, the product or service that is the subject of the coupon. In addition, using current coupon distribution methods, in many cases, the coupon being offered does not represent a significant enough savings to entice the consumer to purchase the product and/or service that is the subject of the coupon. In addition, using current coupon distribution methods, in some cases, the coupon being offered represents a savings in excess of the amount necessary to entice the consumer to purchase the product and/or service that is the subject of the coupon, thereby over discounting the product and/or service and costing the coupon provider revenue. In addition, using current coupon distribution methods, a coupon provider obtains relatively little marketing data from the coupon program because, using current coupon distribution methods, there is little consumer feedback as to why a given coupon was redeemed and what factors influenced the consumer's decision. In addition, using current coupon distribution methods, a coupon provider has little or no control over how much a coupon program will eventually because the actual cost of the program is not known until the number of coupons redeemed is tallied. Consequently, using current coupon distribution methods, there is considerable waste and inefficiency and the current situation represents a disservice to both coupon providers and consumers.

SUMMARY

In accordance with one embodiment, a method and system for providing consumer defined coupons includes a process for providing consumer defined coupons whereby, in one embodiment, a consumer proposes/defines the parameters or "terms" of a proposed coupon and/or marketing offer that the consumer feels would compel the consumer to purchase a product and/or service, shop at a defined store, or perform some other defined action. In one embodiment, the consumer defined coupon terms of the proposed coupon are then provided to a potential coupon provider. In one embodiment, the potential coupon provider is then provided the opportunity to review the consumer defined coupon terms. In one embodiment, the potential coupon provider is then provided the opportunity to accept the consumer defined coupon terms, reject the consumer defined coupon terms, and/or propose alternative coupon terms. In one embodiment, if the potential coupon provider accepts the consumer defined coupon terms, a coupon is then created and provided to the consumer.

In one embodiment, the consumer proposes/defines parameters or "terms" of the proposed coupon and/or marketing offer that include, but are not limited to, one or more of the following: a specific discount on a specific service or product, such as a specific percentage off the price of a specific service or product; a specific price on a specific service or product; a specific discount on the total consumer's spending at a specific store or store chain, such as a specific percent off at checkout; a specific rebate, such as $20.00 off at checkout; multiple units for the price of one, such as two for one, etc.; or any other coupon and/or marketing device terms the consumer defines that would entice the consumer to purchase a product and/or service, shop at a defined store, or perform some other defined action.

In one embodiment, the consumer defined coupon terms of the proposed coupon are entered as data into a computing system either directly or through a computing system implemented financial management system that implements, includes, is accessible by, and/or is otherwise associated with the process for providing consumer defined coupons. Herein, a computing system implemented financial management system can be, but is not limited to, any of the following: a computing system implemented personal financial management system; a computing system implemented home inventory system; a computing system implemented business inventory system; a computing system implemented point-of-sale system; a computing system implemented personal asset management system; a computing system implemented business asset management system; a computing system implemented personal accounting system; a computing system implemented business accounting system; a computing system implemented tax preparation system; and/or any of the numerous computing system implemented financial management systems known to those of skill in the art.

In one embodiment, the consumer defined coupon terms data is provided to a potential coupon provider by storing data representing the consumer defined coupon terms and then providing the potential coupon provider access to the data, either directly or through a computing system implemented financial management system. In one embodiment, the consumer defined coupon terms data is provided to a potential coupon provider by transferring data representing the consumer defined coupon terms to the coupon provider, either directly or through a computing system implemented financial management system.

In one embodiment, the potential coupon provider is then provided the opportunity to review the consumer defined coupon terms, and, in one embodiment, the potential coupon provider is then provided the opportunity to accept the consumer defined coupon terms of the proposed coupon, reject the consumer defined coupon terms, and/or propose alternative coupon terms. In one embodiment, the potential coupon provider reviews each proposed coupon on a case-by-case basis. In one embodiment, consumer defined coupon terms within parameters pre-defined by the coupon provider are automatically accepted. In one embodiment, consumer defined coupon terms within parameters pre-defined by the coupon provider are automatically accepted up to a given cost, number of units, date, or other form of cap and/or limit, as defined by the coupon provider.

In one embodiment, if the potential coupon provider accepts the consumer defined coupon terms, a coupon is then created and provided to the consumer. In one embodiment, if the coupon provider rejects the consumer defined coupon terms, the coupon provider can then propose alternative coupon terms and a coupon based on the proposed alternative coupon terms is then created and provided to the consumer.

In one embodiment, the coupon is created and provided to the consumer by storing data representing the coupon and then providing the consumer access to the data, either directly or through a computing system implemented financial management system. In one embodiment, the coupon is created and provided to the consumer by transferring data representing the coupon to the consumer, either directly or through a computing system implemented financial management system. In one embodiment, the coupon is created and provided to the consumer by transferring data representing the coupon to a designated store, or other location, where the consumer can obtain and/or redeem the coupon.

Using the method and system for providing consumer defined coupons disclosed herein, a consumer defines the terms of a coupon that would entice the consumer to purchase a product or service and/or shop with a specified coupon provider. The coupon provider is then provided the capability to accept, decline or counter the consumer defined coupon terms. Consequently, using the method and system for providing consumer defined coupons disclosed herein, the consumer is benefited by potentially receiving the discount he or she desires. In addition, using the method and system for providing consumer defined coupons disclosed herein, the coupon provider is given the opportunity to selectively and efficiently distribute coupons that are more likely to meet the coupon providers goals since the coupons are created and distributed to specific consumers that have shown interest in the product or service that is the subject of the coupon.

In addition, using the method and system for providing consumer defined coupons disclosed herein, the coupons offered represent consumer defined coupon terms that are significant enough entice the consumer to purchase the product and/or service that is the subject of the coupon without the potential for generically over discounting the price of the product and/or service that is the subject of the coupon. In addition, using the method and system for providing consumer defined coupons disclosed herein, a coupon provider can obtain significant marketing data from the coupon program because, using the method and system for providing consumer defined coupons disclosed herein, there is immediate consumer input as to why a given coupon is desirable and what factors influence the consumer's decision to purchase the product and/or service that is the subject of the coupon.

In addition, using the method and system for providing consumer defined coupons disclosed herein, a coupon provider has a case-by-case approval capability and/or cap setting capability. Therefore, using the method and system for providing consumer defined coupons disclosed herein, the coupon provider has immediate and on-going control over how much a coupon program costs. Consequently, using the method and system for providing consumer defined coupons disclosed herein, both the consumer and the coupon provider are potentially benefited.

As discussed in more detail below, using the below embodiments, with little or no modification and/or user input, there is considerable flexibility, adaptability, and opportunity for customization to meet the specific needs of various users under numerous circumstances.

Figure 1:
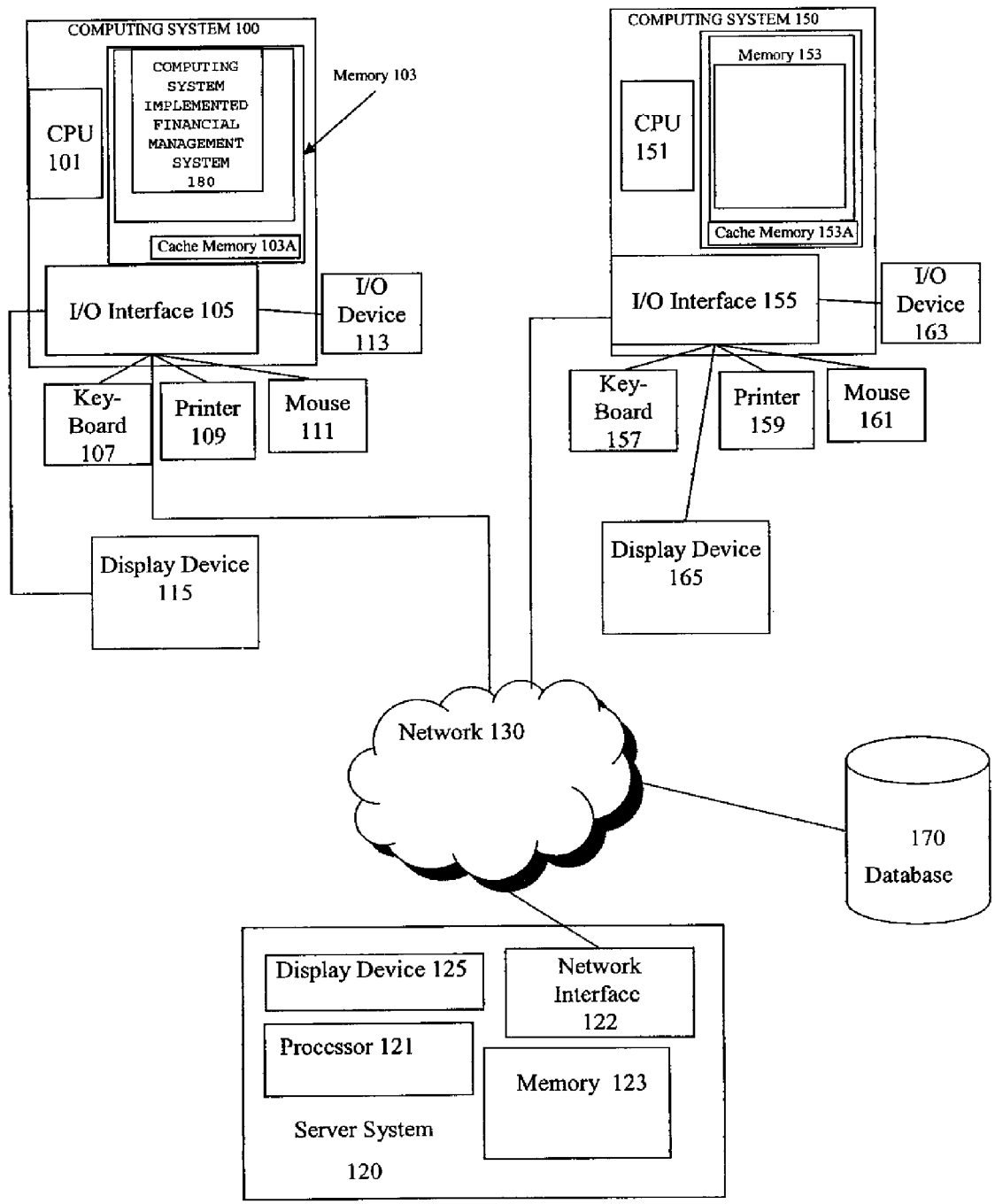
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

For illustrative purposes, some embodiments are described herein within the framework of, and using, one or more computing system implemented financial management systems. Various specific details are discussed below, and shown in the accompanying FIG.s, to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments are implemented in a mobile computing system running mobile operating systems such as Symbian® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. Computing systems also include those in which one or more computing resources (hardware or software) are located remotely and accessed via network, such as a Local Area Network (LAN), Wide Area Network (WAN), a public network, such as the Internet, a private network, a combination of network types, a computing system bus, or other electronic medium in which data may be exchanged between one computing system and one or more other computing system(s), whether known at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, delivered from a website and/or web-based function, transmitted to a remote device, stored on any database, computer server or other storage mechanism, printed, or used in any other way. In addition, in some embodiments, processes and/or systems described herein may make use of input provided to the computer device implementing a process and/or application, discussed herein, via user interface devices such as a keyboard, mouse, touchpad, or any other device capable of providing user input to a computing system or for translating user actions into computing system operations, whether known at the time of filing or as developed later.

Hardware System Architecture

FIG. 1 is a block diagram of an exemplary hardware architecture for implementing one embodiment of a system and method for providing consumer defined coupons, such as exemplary process 200 discussed herein, that includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a computing system implemented financial management system 180 such as, but not limited to: a computing system implemented personal financial management system; a computing system implemented business financial management system; a computing system implemented personal accounting system; a computing system implemented business accounting system; a computing system implemented tax preparation system; a computing system implemented healthcare management system; or any other computing system implemented personal and/or business data management system. In one embodiment, computing system implemented financial management system 180 is stored, in whole, or in part, in memory system 103, and is used by, or includes, as discussed below, a process for providing consumer defined coupons, such as exemplary process 200 discussed below.

Computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing consumer defined coupons and/or a computing system implemented financial management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 is a computing system accessible by a consumer and/or a coupon provider and used and/or accessible by another computing system, such as computing system 150 (discussed below), a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for providing consumer defined coupons, and/or a computing system implemented financial management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 is accessible by a consumer, a coupon provider and, in one embodiment, memory system 153 includes all, or part of, data representing the one or more consumer defined coupon terms and/or coupons such as discussed below.

As discussed in more detail below, in one embodiment, all, or part of, a process for providing consumer defined coupons, and/or a computing system implemented financial management system, can also be loaded, in whole, or in part, into computing system 150 from computing system 100 for storage in memory system 153 and/or cache memory 153A.

Also shown in FIG. 1 is exemplary database 170. In one embodiment, database 170 is a data storage device, a designated server system or computing system, or a designated portion of one or more server systems or computing systems, such as computing systems 100, 150 and 120, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of the consumer, and/or the consumer's agents, a coupon provider, and/or a coupon provider's agents, and/or a process for providing consumer defined coupons, such as exemplary process 200, and/or a computing system implemented process, such as a computing system implemented financial management system 180.

In one embodiment, database 170 is used, controlled, and/or accessible by, a consumer, a coupon provider, a provider of and/or a system and process for providing consumer defined coupons, such as process for providing consumer defined coupons 200 and data representing all, or part, of consumer defined coupon terms data and/or coupon data is stored in database 170. In one embodiment, database 170 is used, controlled, and/or accessible by, a provider of and/or a computing system implemented financial management system, such as a computing system implemented financial management system 180.

In one embodiment, computing systems 100 and 150, and database 170, are coupled to a server system 120 through network 130. In one embodiment, server system 120 typically includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, server system 120 is used, controlled, and/or accessible by, a consumer, a coupon provider, a provider of and/or a system and process for providing consumer defined coupons, such as process for providing consumer defined coupons 200 and data representing all, or part, of consumer defined coupon terms data and/or coupon data is stored in server system 120. In one embodiment, server system 120 is used, controlled, and/or accessible by, a provider of and/or a computing system implemented financial management system, such as a computing system implemented financial management system 180. Network 130 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process for providing consumer defined coupons, such as process for providing consumer defined coupons 200, and/or a computing system implemented financial management system, such as a computing system implemented financial management system 180, and/or data representing consumer defined coupon terms, such as discussed below, and/or data representing the one or more coupons a consumer is to receive, such as discussed below, are stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for providing consumer defined coupons, such as process for providing consumer defined coupons 200, and/or a computing system implemented financial management system, such as computing system implemented financial management system 180, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing consumer defined coupons, such as process for providing consumer defined coupons 200, and/or a computing system implemented financial management system, such as a computing system implemented financial management system 180, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for providing consumer defined coupons, such as process for providing consumer defined coupons 200, and/or a computing system implemented financial management system, such as a computing system implemented financial management system 180, and/or data representing consumer defined coupon terms, such as discussed below, and/or data representing the one or more coupons a consumer is to receive, such as discussed below, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

For example, all, or part, of a process for providing consumer defined coupons, such as process for providing consumer defined coupons 200, and/or a computing system implemented financial management system, such as a computing system implemented financial management system 180, and/or data representing consumer defined coupon terms, such as discussed below, and/or data representing the one or more coupons a consumer is to receive, such as discussed below, may be stored in a memory that is physically located in a location, such as server system memory 123, or database 170, of FIG. 1, different from a computing system, such as computing systems 100 and/or 150 of FIG. 1, utilizing a process for providing consumer defined coupons, and/or a computing system implemented financial management system, data representing consumer defined coupon terms, such as discussed below, and/or data representing the one or more coupons a consumer is to receive, such as discussed below. In one embodiment, all, or part, of a process for providing consumer defined coupons, and/or a computing system implemented financial management system, and/or data representing consumer defined coupon terms, such as discussed below, and/or data representing the one or more coupons a consumer is to receive, such as discussed below, may be stored in a memory that is physically located, separate from the computing system's processor(s), such as CPUs 101 and 151 of FIG. 1, and the computing system CPUs can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process for providing consumer defined coupons, such as process for providing consumer defined coupons 200, and/or a computing system implemented financial management system, such as a computing system implemented financial management system 180, and/or data representing consumer defined coupon terms, such as discussed below, and/or data representing the one or more coupons a consumer is to receive, such as discussed below, is a portable computer, a workstation, a two-way pager, a cellular telephone, a smart phone, a digital wireless telephone, a PDA, a server computer, an Internet appliance, or any other device that includes components that can execute all, or part, of a process for providing consumer defined coupons, and/or a computing system implemented financial management system, in accordance with at least one of the embodiments as described herein. Similarly, in another embodiment, a process for providing consumer defined coupons, and/or a computing system implemented financial management system, and/or data representing consumer defined coupon terms, such as discussed below, and/or data representing the one or more coupons a consumer is to receive, such as discussed below, may be implemented on, and/or run, and/or stored on, a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

Process

Herein, the terms "consumer", "individual", "user", and/or "customer" are used interchangeably to denote any party interfacing and/or interacting with a process for providing consumer defined coupons, and/or a person who is the subject of, and/or target of, all, or part of, any data/information obtained by a process for providing consumer defined coupons, and/or a legal guardian of a person who is the subject of, and/or target of, any data/information obtained by a process for providing consumer defined coupons, and/or an authorized agent of any party interfacing and/or interacting with a process for providing consumer defined coupons, and/or a person who is the subject of, and/or target of, any information obtained by a process for providing consumer defined coupons, and/or any other authorized party associated with any party interfacing and/or interacting with a process for providing consumer defined coupons, and/or a person who is the subject of, and/or target of, any information obtained by a process for providing consumer defined coupons.

Herein, the term "coupon" is used to denote coupons, discount certificates, discount vouchers, sales offers, and/or any other marketing tool and/or device that is presented and/or offered to a consumer.

As used herein, the term computing system implemented financial management system includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filling or as developed later.

In accordance with one embodiment, a method and system for providing consumer defined coupons includes a process for providing consumer defined coupons whereby, in one embodiment, a consumer proposes/defines the parameters or "terms" of a proposed coupon and/or marketing offer that the consumer feels would compel the consumer to purchase a product and/or service, shop at a defined store, or perform some other defined action. In one embodiment, the consumer defined coupon terms of the proposed coupon are then entered as data into a computing system and the consumer defined coupon terms data is provided to a potential coupon provider. In one embodiment, the potential coupon provider is then provided the opportunity to review the consumer defined coupon terms. In one embodiment, the potential coupon provider is then provided the opportunity to accept the consumer defined coupon terms, reject the consumer defined coupon terms, and/or propose alternative coupon terms. In one embodiment, it the potential coupon provider accepts the consumer defined coupon terms, a coupon is then created and provided to the consumer.

Figure 2:
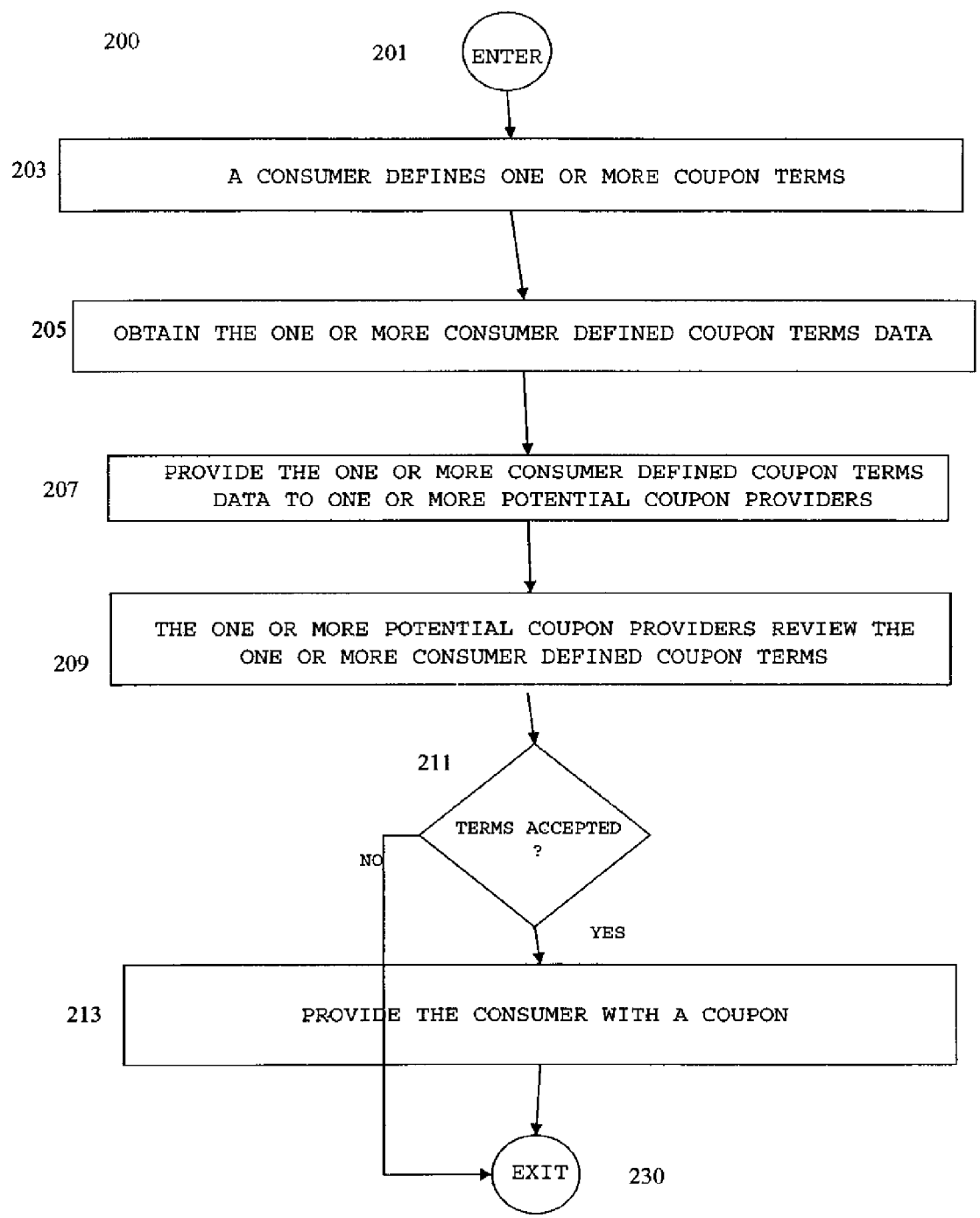
FIG. 2 is a flow chart depicting a process for providing consumer defined coupons in accordance with one embodiment.

FIG. 2 a flow chart depicting a process for providing consumer defined coupons 200 in accordance with one embodiment. Process for providing consumer defined coupons 200 begins at ENTER OPERATION 201 of FIG. 2 and process flow proceeds to A CONSUMER DEFINES ONE OR MORE COUPON TERMS OPERATION 203.

In one embodiment, at A CONSUMER DEFINES ONE OR MORE COUPON TERMS OPERATION 203 a consumer proposes/defines the parameters or "terms" of a proposed coupon and/or marketing offer that the consumer feels would compel the consumer to purchase a product and/or service, shop at a defined store, or perform some other defined action.

In one embodiment, at A CONSUMER DEFINES ONE OR MORE COUPON TERMS OPERATION 203, the consumer proposes/defines any parameters or "terms" of the proposed coupon and/or marketing offer that the consumer finds desirable and/or compelling. For instance, as one example, in one embodiment, at A CONSUMER DEFINES ONE OR MORE COUPON TERMS OPERATION 203, the consumer defined coupon terms of the proposed coupon includes, but are not limited to, a specific discount on a specific service or product, such as a specific percentage off the price of a specific service or product. As a more specific example, the consumer defined coupon terms may include ten percent off of the listed price for a specific product. Typically, this type of coupon would be issued by a product manufacturer and/or a seller.

As another example, in one embodiment, at A CONSUMER DEFINES ONE OR MORE COUPON TERMS OPERATION 203, the consumer defined coupon terms of the proposed coupon includes, but are not limited to, a specific price on a specific service or product. Typically, this type of coupon would be issued by a product manufacturer and/or a seller.

As another example, in one embodiment, at A CONSUMER DEFINES ONE OR MORE COUPON TERMS OPERATION 203, the consumer defined coupon terms of the proposed coupon includes, but are not limited to, a specific discount on the total consumer's spending at a specific store or store chain, such as a specific percent off at checkout. As a more specific example, the consumer defined coupon terms may include 20 percent off the total amount spent at a specified store chain or a specific store. Typically, this type of coupon would be issued by a seller/store owner and/or manager.

As another example, in one embodiment, at A CONSUMER DEFINES ONE OR MORE COUPON TERMS OPERATION 203, the consumer defined coupon terms of the proposed coupon includes, but are not limited to, a specific rebate and/or discount, such as $20.00 off at checkout. Typically, this type of coupon would be issued by a seller/store owner and/or manager.

As another example, in one embodiment, at A CONSUMER DEFINES ONE OR MORE COUPON TERMS OPERATION 203, the consumer defined coupon terms of the proposed coupon includes, but are not limited to, multiple units for the price of one, such as two of a specified product and/or service for the price of one of a specified product and/or service, or a second unit or the specified product and/or service at a significant discount. Typically, this type of coupon would be issued by a product manufacturer and/or a seller.

As another example, in one embodiment, at A CONSUMER DEFINES ONE OR MORE COUPON TERMS OPERATION 203, the consumer defined coupon terms of the proposed coupon includes any other coupon and/or marketing device terms the consumer defines that would entice the consumer to purchase a product and/or service, shop at a defined store, or perform some other defined action.

The specific consumer defined coupon terms of the proposed coupon discussed above are but a few specific examples of possible consumer defined coupon terms of the proposed coupon. In other embodiments, any other terms, or combination of terms, considered desirable by a consumer can be defined at A CONSUMER DEFINES ONE OR MORE COUPON TERMS OPERATION 203.

In one embodiment, at A CONSUMER DEFINES ONE OR MORE COUPON TERMS OPERATION 203 the consumer defined coupon terms of the proposed coupon are entered as data into a computing system by the consumer, or a consumer's agents, through a user interface device such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later.

Returning to FIG. 2, in one embodiment, at A CONSUMER DEFINES ONE OR MORE COUPON TERMS OPERATION 203 the consumer defined coupon terms of the proposed coupon are entered as data into a computing system implementing process for providing consumer defined coupons 200 either directly or through a computing system implemented financial management system that implements, includes, is accessible by, and/or is otherwise associated with the process for providing consumer defined coupons. Herein, a computing system implemented financial management system can be, but is not limited to, any of the following: a computing system implemented personal financial management system; a computing system implemented home inventory system; a computing system implemented business inventory system; a computing system implemented point-of-sale system; a computing system implemented personal asset management system; a computing system implemented business asset management system; a computing system implemented personal accounting system; a computing system implemented business accounting system; a computing system implemented tax preparation system; and/or any of the numerous computing system implemented financial management systems known to those of skill in the art.

In one embodiment, once a consumer proposes/defines the parameters or "terms" of a proposed coupon and/or marketing offer that the consumer feels would compel the consumer to purchase a product and/or service, shop at a defined store, or perform some other defined action at A CONSUMER DEFINES ONE OR MORE COUPON TERMS OPERATION 203, process flow proceeds to OBTAIN THE ONE OR MORE CONSUMER DEFINED COUPON TERMS DATA OPERATION 205.

In one embodiment at OBTAIN THE ONE OR MORE CONSUMER DEFINED COUPON TERMS DATA OPERATION 205 process for providing consumer defined coupons 200 obtains data representing the one or more consumer defined coupon terms of A CONSUMER DEFINES ONE OR MORE COUPON TERMS OPERATION 203.

In one embodiment, at OBTAIN THE ONE OR MORE CONSUMER DEFINED COUPON TERMS DATA OPERATION 205 process for providing consumer defined coupons 200 obtains the data representing the one or more consumer defined coupon terms of A CONSUMER DEFINES ONE OR MORE COUPON TERMS OPERATION 203 from the consumer as discussed above. In one embodiment, at OBTAIN THE ONE OR MORE CONSUMER DEFINED COUPON TERMS DATA OPERATION 205 process for providing consumer defined coupons 200 obtains the data representing the one or more consumer defined coupon terms of A CONSUMER DEFINES ONE OR MORE COUPON TERMS OPERATION 203 from a computing system implemented financial management system as discussed above.

In one embodiment, at OBTAIN THE ONE OR MORE CONSUMER DEFINED COUPON TERMS DATA OPERATION 205 process for providing consumer defined coupons 200 obtains the data representing the one or more consumer defined coupon terms of A CONSUMER DEFINES ONE OR MORE COUPON TERMS OPERATION 203 from the consumer by providing process for providing consumer defined coupons 200, and/or a computing system implemented financial management system associated with process for providing consumer defined coupons 200, access to the data on a database, such as database 170 of FIG. 1, a computing system, such as computing systems 100 and/or 150 of FIG. 1, and/or a server system, such as server system 120 of FIG. 1, or a web-site or other web-based system, and/or using a computer program product as defined herein.

Returning to FIG. 2, in one embodiment, at OBTAIN THE ONE OR MORE CONSUMER DEFINED COUPON TERMS DATA OPERATION 205 process for providing consumer defined coupons 200 obtains the data representing the one or more consumer defined coupon terms of A CONSUMER DEFINES ONE OR MORE COUPON TERMS OPERATION 203 from the consumer through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or any other network capable of allowing communication between two or more computing systems, whether available or known at the time of filing or as later developed.

Returning to FIG. 2, in one embodiment, at OBTAIN THE ONE OR MORE CONSUMER DEFINED COUPON TERMS DATA OPERATION 205 process for providing consumer defined coupons 200 obtains the data representing the one or more consumer defined coupon terms of A CONSUMER DEFINES ONE OR MORE COUPON TERMS OPERATION 203 from the consumer through e-mail or through text messaging.

In one embodiment, at OBTAIN THE ONE OR MORE CONSUMER DEFINED COUPON TERMS DATA OPERATION 205 process for providing consumer defined coupons 200 obtains the data representing the one or more consumer defined coupon terms of A CONSUMER DEFINES ONE OR MORE COUPON TERMS OPERATION 203 from the consumer using any method, apparatus, process or mechanism for transferring data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, whether known at the time of filing or as thereafter developed.

In one embodiment, once process for providing consumer defined coupons 200 obtains the data representing the one or more consumer defined coupon terms of A CONSUMER DEFINES ONE OR MORE COUPON TERMS OPERATION 203 at OBTAIN THE ONE OR MORE CONSUMER DEFINED COUPON TERMS DATA OPERATION 205 the data is stored in whole, or in part, in a database maintained by, accessible by, owned by, or otherwise related to: process for providing consumer defined coupons 200, and/or a provider of process for providing consumer defined coupons 200; a computing system implemented financial management system, and/or a provider of a computing system implemented financial management system; one or more coupon providers; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the data representing the one or more consumer defined coupon terms stored as described above is maintained, in whole, or in part, by: process for providing consumer defined coupons 200, and/or a provider of process for providing consumer defined coupons 200; a computing system implemented financial management system, and/or a provider of a computing system implemented financial management system; one or more coupon providers; a third party data storage institution; any third party service or institution; or any other parties. In these embodiments, access to the data representing the one or more consumer defined coupon terms is then provided to process for providing consumer defined coupons 200, and/or a computing system implemented financial management system, by providing access to the data and/or providing the data on a computer program product.

In one embodiment once process for providing consumer defined coupons 200 obtains data representing the one or more consumer defined coupon terms of A CONSUMER DEFINES ONE OR MORE COUPON TERMS OPERATION 203 at OBTAIN THE ONE OR MORE CONSUMER DEFINED COUPON TERMS DATA OPERATION 205, process flow proceeds to PROVIDE THE ONE OR MORE CONSUMER DEFINED COUPON TERMS DATA TO ONE OR MORE POTENTIAL COUPON PROVIDERS OPERATION 207.

In one embodiment, at PROVIDE THE ONE OR MORE CONSUMER DEFINED COUPON TERMS DATA TO ONE OR MORE POTENTIAL COUPON PROVIDERS OPERATION 207 the consumer defined coupon terms of the proposed coupon are then provided to at least one potential coupon provider.

As noted above, what potential coupon provider is given access to the consumer defined coupon terms of the proposed coupon depends on the consumer defined coupon terms themselves. For example, if the consumer defined coupon terms of the proposed coupon includes a specific discount on a specific service or product, such as a specific percentage off the price of a specific service or product, a product manufacturer and/or a seller would typically be given access to the consumer defined coupon terms at PROVIDE THE ONE OR MORE CONSUMER DEFINED COUPON TERMS DATA TO ONE OR MORE POTENTIAL COUPON PROVIDERS OPERATION 207.

As another example, if the consumer defined coupon terms of the proposed coupon includes a specific price on a specific service or product, a product manufacturer and/or a seller would typically be given access to the consumer defined coupon terms at PROVIDE THE ONE OR MORE CONSUMER DEFINED COUPON TERMS DATA TO ONE OR MORE POTENTIAL COUPON PROVIDERS OPERATION 207.

As another example, if the consumer defined coupon terms of the proposed coupon includes a specific discount on the total consumer's spending at a specific store or store chain, such as a specific percent off at checkout, a seller/store owner and/or manager would typically be given access to the consumer defined coupon terms at PROVIDE THE ONE OR MORE CONSUMER DEFINED COUPON TERMS DATA TO ONE OR MORE POTENTIAL COUPON PROVIDERS OPERATION 207.

As another example, if the consumer defined coupon terms of the proposed coupon includes a specific rebate and/or discount, such as $20.00 off at checkout, a seller/store owner and/or manager would typically be given access to the consumer defined coupon terms at PROVIDE THE ONE OR MORE CONSUMER DEFINED COUPON TERMS DATA TO ONE OR MORE POTENTIAL COUPON PROVIDERS OPERATION 207.

As another example, if the consumer defined coupon terms of the proposed coupon includes multiple units for the price of one, such as two of a specified product and/or service for the price of one of a specified product and/or service, or a second unit or the specified product and/or service at a significant discount, a product manufacturer and/or a seller would typically be given access to the consumer defined coupon terms at PROVIDE THE ONE OR MORE CONSUMER DEFINED COUPON TERMS DATA TO ONE OR MORE POTENTIAL COUPON PROVIDERS OPERATION 207

In one embodiment, at PROVIDE THE ONE OR MORE CONSUMER DEFINED COUPON TERMS DATA TO ONE OR MORE POTENTIAL COUPON PROVIDERS OPERATION 207, data representing consumer defined coupon terms of A CONSUMER DEFINES ONE OR MORE COUPON TERMS OPERATION 203 is provided to at least one potential coupon provider either directly, or through a computing system implemented financial management system that implements, includes, is accessible by, and/or is otherwise associated with the process for providing consumer defined coupons.

In one embodiment, at PROVIDE THE ONE OR MORE CONSUMER DEFINED COUPON TERMS DATA TO ONE OR MORE POTENTIAL COUPON PROVIDERS OPERATION 207, data representing consumer defined coupon terms of A CONSUMER DEFINES ONE OR MORE COUPON TERMS OPERATION 203 is provided to at least one potential coupon provider by providing the at least one potential coupon provider access to the data on a database, such as database 170 of FIG. 1, a computing system, such as computing systems 100 and/or 150 of FIG. 1, and/or a server system, such as server system 120 of FIG. 1, or a web-site or other web-based system, and/or using a computer program product as defined herein.

Returning to FIG. 2, in one embodiment, at PROVIDE THE ONE OR MORE CONSUMER DEFINED COUPON TERMS DATA TO ONE OR MORE POTENTIAL COUPON PROVIDERS OPERATION 207, data representing consumer defined coupon terms of A CONSUMER DEFINES ONE OR MORE COUPON TERMS OPERATION 203 is provided to at least one potential coupon provider through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or any other network capable of allowing communication between two or more computing systems, whether available or known at the time of filing or as later developed.

Returning to FIG. 2, in one embodiment, at PROVIDE THE ONE OR MORE CONSUMER DEFINED COUPON TERMS DATA TO ONE OR MORE POTENTIAL COUPON PROVIDERS OPERATION 207, data representing consumer defined coupon terms of A CONSUMER DEFINES ONE OR MORE COUPON TERMS OPERATION 203 is provided to at least one potential coupon provider through e-mail or through text messaging.

In one embodiment, at PROVIDE THE ONE OR MORE CONSUMER DEFINED COUPON TERMS DATA TO ONE OR MORE POTENTIAL COUPON PROVIDERS OPERATION 207, data representing consumer defined coupon terms of A CONSUMER DEFINES ONE OR MORE COUPON TERMS OPERATION 203 is provided to at least one potential coupon provider using any method, apparatus, process or mechanism for transferring data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, whether known at the time of filing or as thereafter developed.

In one embodiment, once the consumer defined coupon terms of the proposed coupon are provided to at least one potential coupon provider at PROVIDE THE ONE OR MORE CONSUMER DEFINED COUPON TERMS DATA TO ONE OR MORE POTENTIAL COUPON PROVIDERS OPERATION 207, process flow proceeds to THE ONE OR MORE POTENTIAL COUPON PROVIDERS REVIEW THE ONE OR MORE CONSUMER DEFINED COUPON TERMS OPERATION 209.

In one embodiment, at THE ONE OR MORE POTENTIAL COUPON PROVIDERS REVIEW THE ONE OR MORE CONSUMER DEFINED COUPON TERMS OPERATION 209 the one or more potential coupon providers of PROVIDE THE ONE OR MORE CONSUMER DEFINED COUPON TERMS DATA TO ONE OR MORE POTENTIAL COUPON PROVIDERS OPERATION 207 are provided the opportunity to review the consumer defined coupon terms of A CONSUMER DEFINES ONE OR MORE COUPON TERMS OPERATION 203.

In one embodiment, at THE ONE OR MORE POTENTIAL COUPON PROVIDERS REVIEW THE ONE OR MORE CONSUMER DEFINED COUPON TERMS OPERATION 209 the one or more potential coupon providers of PROVIDE THE ONE OR MORE CONSUMER DEFINED COUPON TERMS DATA TO ONE OR MORE POTENTIAL COUPON PROVIDERS OPERATION 207 review each proposed coupon on a case-by-case basis.

In one embodiment, at THE ONE OR MORE POTENTIAL COUPON PROVIDERS REVIEW THE ONE OR MORE CONSUMER DEFINED COUPON TERMS OPERATION 209 the one or more potential coupon providers of PROVIDE THE ONE OR MORE CONSUMER DEFINED COUPON TERMS DATA TO ONE OR MORE POTENTIAL COUPON PROVIDERS OPERATION 207 pre-define acceptable terms parameters and consumer defined coupon terms within these pre-defined parameters are automatically accepted. For instance, a potential coupon provider can pre-define/pre-approve all consumer defined coupon terms that consist of a specific discount percentage, or less. As another example, a potential coupon provider can pre-define/pre-approve all consumer defined coupon terms that result in a predefined sale price, or any price greater than the predefined sale price. This feature can save significant processing time.

In one embodiment, at THE ONE OR MORE POTENTIAL COUPON PROVIDERS REVIEW THE ONE OR MORE CONSUMER DEFINED COUPON TERMS OPERATION 209 the one or more potential coupon providers of PROVIDE THE ONE OR MORE CONSUMER DEFINED COUPON TERMS DATA TO ONE OR MORE POTENTIAL COUPON PROVIDERS OPERATION 207 also pre-define cost caps, coupon number caps and/or time frame caps. In these embodiments, consumer defined coupon terms within parameters pre-defined by the coupon provider are automatically accepted up to a given cost, number of units, or date, as defined by the coupon provider. Using these embodiments, a coupon provider can control the overall cost of a coupon program.

In one embodiment, at THE ONE OR MORE POTENTIAL COUPON PROVIDERS REVIEW THE ONE OR MORE CONSUMER DEFINED COUPON TERMS OPERATION 209 the one or more potential coupon providers of PROVIDE THE ONE OR MORE CONSUMER DEFINED COUPON TERMS DATA TO ONE OR MORE POTENTIAL COUPON PROVIDERS OPERATION 207 can review the consumer defined coupon terms based on any criteria, and using any method, the coupon provider desires.

In one embodiment, once the one or more potential coupon providers of PROVIDE THE ONE OR MORE CONSUMER DEFINED COUPON TERMS DATA TO ONE OR MORE POTENTIAL COUPON PROVIDERS OPERATION 207 are provided the opportunity to review the consumer defined coupon terms of A CONSUMER DEFINES ONE OR MORE COUPON TERMS OPERATION 203 at THE ONE OR MORE POTENTIAL COUPON PROVIDERS REVIEW THE ONE OR MORE CONSUMER DEFINED COUPON TERMS OPERATION 209, the one or more potential coupon providers are given the opportunity to accept the consumer defined coupon terms or reject the consumer defined coupon terms at TERMS ACCEPTED? OPERATION 211.

In one embodiment, at TERMS ACCEPTED? OPERATION 211 a potential coupon provider decides to accept or reject the consumer defined coupon terms of A CONSUMER DEFINES ONE OR MORE COUPON TERMS OPERATION 203. In one embodiment, if the potential coupon provider rejects the consumer defined coupon terms, i.e., a NO response is given at TERMS ACCEPTED? OPERATION 211, the consumer is notified of the rejection and process flow proceeds directly to EXIT OPERATION 230. In one embodiment, if the potential coupon provider rejects the consumer defined coupon terms, the potential coupon provider can then propose alternative coupon terms and/or issue a substitute coupon.

In one embodiment, if the potential coupon provider accepts the consumer defined coupon terms, i.e., a YES response is given at TERMS ACCEPTED? OPERATION 211, or the potential coupon provider decides to issue a substitute coupon based on the coupon provider's proposed alternative terms, process flow proceeds to PROVIDE THE CONSUMER WITH A COUPON OPERATION 213.

In one embodiment, at PROVIDE THE CONSUMER WITH A COUPON OPERATION 213 a coupon is created and provided to the consumer, either directly or through a computing system implemented financial management system.

In one embodiment, at PROVIDE THE CONSUMER WITH A COUPON OPERATION 213 the coupon is created and provided to the consumer by storing data representing the coupon and then providing the consumer access to the data, either directly or through a computing system implemented financial management system. In one embodiment, at PROVIDE THE CONSUMER WITH A COUPON OPERATION 213 the coupon is created and provided to the consumer by transferring data representing the coupon to the consumer, either directly or through a computing system implemented financial management system. In one embodiment, at PROVIDE THE CONSUMER WITH A COUPON OPERATION 213 the coupon is created and provided to the consumer by transferring data representing the coupon to a designated store, or other location, where the consumer can obtain and/or redeem the coupon.

For instance, in one embodiment, at PROVIDE THE CONSUMER WITH A COUPON OPERATION 213, data representing the coupon is provided to the consumer directly through a consumer computing system, or through a computing system implemented financial management system that implements, includes, is accessible by, and/or is otherwise associated with process for providing consumer defined coupons 200.

As another example, in one embodiment, at PROVIDE THE CONSUMER WITH A COUPON OPERATION 213, data representing the coupon is provided to the consumer by providing the consumer access to the data on a database, such as database 170 of FIG. 1, a computing system, such as computing systems 100 and/or 150 of FIG. 1, and/or a server system, such as server system 120 of FIG. 1, or a web-site or other web-based system, and/or using a computer program product as defined herein.

Returning to FIG. 2, as another example, in one embodiment, at PROVIDE THE CONSUMER WITH A COUPON OPERATION 213, data representing the coupon is provided to the consumer through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or any other network capable of allowing communication between two or more computing systems, whether available or known at the time of filing or as later developed.

Returning to FIG. 2, as another example, in one embodiment, at PROVIDE THE CONSUMER WITH A COUPON OPERATION 213, data representing the coupon is provided to the consumer through e-mail or through text messaging.

As another examples in one embodiment, at PROVIDE THE CONSUMER WITH A COUPON OPERATION 213, data representing the coupon is provided to the consumer using any method, apparatus, process or mechanism for transferring data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, whether known at the time of filing or as thereafter developed.

As another example, in one embodiment, at PROVIDE THE CONSUMER WITH A COUPON OPERATION 213, data representing the coupon is provided to the consumer through postal services.

In one embodiment, once a coupon is created and provided to the consumer at PROVIDE THE CONSUMER WITH A COUPON OPERATION 213, process flow proceeds to EXIT OPERATION 230. In one embodiment, at EXIT OPERATION 230, process for providing consumer defined coupons 200 is exited to await new data and/or a new coupon request.

Using process for providing consumer defined coupons 200, a consumer defines the terms of a coupon that would entice the consumer to purchase a product or service and/or shop with a specified coupon provider. The coupon provider is then provided the capability to accept, decline or counter the consumer defined coupon terms. Consequently, using process for providing consumer defined coupons 200, the consumer is benefited by potentially receiving the discount he or she desires.

In addition, using process for providing consumer defined coupons 200, the coupon provider is given the opportunity to selectively and efficiently distribute coupons that are more likely to meet the coupon provider's goals since the coupons are created and distributed to specific consumers that have shown interest in the product or service that is the subject of the coupon. In additions using process for providing consumer defined coupons 200, the coupons offered represent a consumer defined savings that is significant enough entice the consumer to purchase the product and/or service that is the subject of the coupon without the potential for generically over discounting the price of the product and/or service that is the subject of the coupon. In addition, using process for providing consumer defined coupons 200, a coupon provider can obtain significant marketing data from the coupon program because, using process for providing consumer defined coupons 200, there is immediate consumer input as to why a given coupon is desirable and what factors influence the consumer's decision to purchase the product and/or service that is the subject of the coupon. In addition, using process for providing consumer defined coupons 200, a coupon provider has a case-by-case approval capability and cap/limit setting capability. Therefore, using process for providing consumer defined coupons 200, the coupon provider has real time control over how much a coupon program costs. Consequently, using process for providing consumer defined coupons 200, both the consumer and the coupon provider are potentially benefited.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "defining", "accessing", "analyzing", "obtaining", "deriving", "determining", "reviewing", "creating", "identifying", "transferring", "storing", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer program product for providing a process for providing consumer defined coupons comprising:
    a nontransitory computer readable medium;
    and computer program code, encoded on the computer readable medium, comprising computer readable instructions for:
    providing, as a function of a financial management system executed by a consumer computing system, a consumer the ability to define one or more coupon terms for a proposed new coupon that a consumer desires from a potential coupon provider;
    obtaining data by the financial management system, the obtained data representing the one or more consumer defined coupon terms for a proposed new coupon that a consumer desires from a potential coupon provider, the new coupon not previously existing;
    selecting, by the financial management system from a plurality of potential coupon providers, based on the particular defined coupon terms, a first coupon provider to be provided the defined coupon terms, the selected coupon provider being a manufacturer of a named product if the consumer-defined coupon terms include a desired percentage discount off of a normal price, the selected coupon provider being a retail outlet manager if the consumer defined coupon terms include a desired discount off of a total spending at a specific store or store chain managed by the retail outlet manager;
    providing, by the financial management system to a coupon provider computing system of the selected coupon provider, the coupon provider computing system being coupled to the consumer computing system, the data representing the one or more consumer defined coupon terms;
    analyzing, at the coupon provider computing system, the selected coupon provider, the one or more consumer defined coupon terms;
    automatically accepting or rejecting, at the coupon provider computing system, one or more of the consumer defined coupon terms, based on predefined provider acceptance criteria, the predefined acceptance criteria comprising consideration of the total cost, the number of units, and the date of the coupon; and
    if the selected coupon provider rejects the one or more consumer defined coupon terms, the selected coupon provider proposing substitute coupon terms for a potential coupon provider proposed coupon;
    if the selected coupon provider accepts the one or more consumer defined coupon terms, creating a coupon in accordance with the one or more consumer defined coupon terms and providing, using the respective coupon provider computing system to the financial management system, the created coupon to the financial management system.

2. The computer program product for providing a process for providing consumer defined coupons of claim 1, wherein;
    the one or more consumer defined coupon terms comprises one or more consumer defined coupon terms from the following list of consumer defined coupon terms:
    a specific discount on a specific service or product;
    a specific price on a specific service or product;
    a specific discount on the total consumer's spending at a specific store or store chain;
    a specific rebate at a specific store or store chain; or
    multiple units of a specific service or product for a specific price.

3. The computer program product for providing a process for providing consumer defined coupons of claim 1, wherein;
    providing the at least one potential coupon provider the ability to analyze the one or more consumer defined coupon terms comprises at least one potential coupon provider pre-defining coupon term limits and comparing the one or more consumer defined coupon terms with the pre-defined coupon term limits.

4. The computer program product for providing a process for providing consumer defined coupons of claim 3, wherein;
    the pre-defined coupon term limits comprise a lowest cost limit.

5. The computer program product for providing a process for providing consumer defined coupons of claim 3, wherein;
    the pre-defined coupon term limits comprise a largest discount limit.

6. The computer program product for providing a process for providing consumer defined coupons of claim 3, wherein;
    the pre-defined coupon term limits comprise a coupon use time limit.

7. The computer program product for providing a process for providing consumer defined coupons of claim 3, wherein;
    the pre-defined coupon term limits comprise a maximum coupon program cost limit.

8. The computer program product for providing a process for providing consumer defined coupons of claim 1, wherein;
    the computer program code encoded on the computer readable medium further comprises computer readable instructions for:
    providing the selected coupon provider with the ability to propose substitute coupon terms if the at least one potential coupon provider rejects any of the one or more consumer defined coupon terms.

9. A computer program product for providing a process for providing consumer defined coupons comprising:
    a nontransitory computer readable medium;
    and computer program code, encoded on the computer readable medium, comprising computer readable instructions for:
    receiving, by a financial management system of a consumer computing system, one or more coupon terms for a proposed new coupon that a consumer desires, the new coupon not previously existing;
    selecting, by the financial management system from a plurality of potential coupon providers, based on the particular defined coupon terms, a first coupon provider to be provided the defined coupon terms, the selected coupon provider being a manufacturer of a named product if the consumer-defined coupon terms include a desired percentage discount off of a normal price, the selected coupon provider being a retail outlet manager if the consumer-defined coupon terms include a desired discount off of a total spending at a specific store or store chain managed by the retail outlet manager;

providing, by the financial management system to a coupon provider computing system of the selected coupon provider, the coupon provider computing system being coupled to the consumer computing system, the data representing the one or more consumer defined coupon terms;

analyzing, by the coupon provider computing system, the one or more consumer defined coupon terms; and automatically accepting or rejecting, by the coupon provider computing system, one or more of the one or more consumer defined coupon terms, based on predefined provider acceptance criteria, the predefined acceptance criteria comprising consideration of the total cost, the number of units, and the date of the coupon;

if the selected coupon provider resects the one or more consumer defined coupon terms, the selected coupon provider proposing substitute coupon terms for a potential coupon provider proposed coupon;

if the selected coupon provider accepts the one or more consumer defined coupon terms, creating a coupon in accordance with the one or more consumer defined coupon terms and providing, using the coupon provider computing system to the financial management system, the created coupon to the financial management system.

10. A system for providing consumer defined coupons comprising:

one or more computing processors; and one or more memories coupled to the one or more computing processors, the one or more memories having stored therein instructions which when executed by the one or more computing processors perform a process for providing consumer defined coupons, the process for providing consumer defined coupons comprising:

obtaining, by a financial management system of a consumer computing system data representing one or more consumer defined coupon terms;

selecting, by the financial management system from a plurality of coupon providers, a first coupon provider to be provided the defined coupon terms, the selection being based on the particular defined coupon terms, the selected coupon provider being a manufacturer of a named product if the consumer-defined coupon terms include a desired percentage discount off of a normal price, the selected coupon provider being a retail outlet manager if the consumer-defined coupon terms include a desired discount off of a total spending at a specific store or store chain managed by the retail outlet manager;

receiving, from the financial management system at a coupon provider computing system of the selected coupon provider, the data representing the one or more consumer defined coupon terms for a proposed new coupon that a consumer desires, the new coupon not previously existing;

analyzing, at the coupon provider computing system, the one or more consumer defined coupon terms;

automatically accepting or rejecting, at the respective coupon provider computing system, the one or more consumer defined coupon terms, based on predefined provider acceptance criteria, the predefined acceptance criteria comprising consideration of the total cost, the number of units, and the date of the proposed coupon; and if the selected coupon provider rejects the one or more consumer defined coupon terms, the selected coupon provider proposing substitute coupon terms for a potential coupon provider proposed coupon;

if the selected coupon provider accepts the one or more consumer defined coupon terms, creating a coupon in accordance with the one or more consumer defined coupon terms and providing, using the coupon provider computing system to the financial management system, the created coupon to the financial management system.

11. The system for providing consumer defined coupons of claim 10, wherein;

the one or more consumer defined coupon terms comprises one or more consumer defined coupon terms from the following list of consumer defined coupon terms:

a specific discount on a specific service or product;

a specific price on a specific service or product;

a specific discount on the total consumer's spending at a specific store or store chain;

a specific rebate at a specific store or store chain; or multiple units of a specific service or product for a specific price.

12. The system for providing consumer defined coupons of claim 10, wherein;

analyzing the one or more consumer defined coupon terms comprises at least one potential coupon provider pre-defining coupon term limits and comparing the one or more consumer defined coupon terms with the pre-defined coupon term limits.

13. The system for providing consumer defined coupons of claim 12, wherein;

the pre-defined coupon term limits comprise a lowest cost limit.

14. The system for providing consumer defined coupons of claim 12, wherein;

the pre-defined coupon term limits comprise a largest discount limit.

15. The system for providing consumer defined coupons of claim 12, wherein;

the pre-defined coupon term limits comprise a coupon use time limit.

16. The system for providing consumer defined coupons of claim 12, wherein;

the pre-defined coupon term limits comprise a maximum coupon program cost limit.

* * * * *

UNITED STATES PATENT AND TRADEMARK OFFICE
CERTIFICATE OF CORRECTION

PATENT NO. : 8,788,323 B2
APPLICATION NO. : 11/780424
DATED : July 22, 2014
INVENTOR(S) : Benjamin Weiss et al.

Page 1 of 1

It is certified that error appears in the above-identified patent and that said Letters Patent is hereby corrected as shown below:

In the Claims:

In Column 23, Line 15, Claim 9, delete "resects" and insert --rejects--.

Signed and Sealed this
Thirtieth Day of September, 2014

Michelle K. Lee
*Deputy Director of the United States Patent and Trademark Office*